United States Patent

[11] 3,618,689

| | | |
|---|---|---|
| [72] | Inventor | Dale F. German<br>Bryan, Ohio |
| [21] | Appl. No. | 880,798 |
| [22] | Filed | Nov. 28, 1969 |
| [45] | Patented | Nov. 9, 1971 |
| [73] | Assignee | The Aro Corporation<br>Bryan, Ohio<br>Continuation-in-part of application Ser. No.<br>730,340, May 20, 1968, now abandoned. |

[54] OVERRUN CONTROL AND PRESSURE REGULATOR
4 Claims, 2 Drawing Figs.

[52] U.S. Cl. .................................................. 137/462,
137/464
[51] Int. Cl. ..................................................... F16k 17/20
[50] Field of Search .......................................... 137/458,
462, 464, 459, 460, 465, 466

[56] References Cited
UNITED STATES PATENTS

| 365,712 | 1887 | Thomas ........................ | 137/462 |
| 424,199 | 1890 | Haskell ........................ | 137/462 |
| 2,359,111 | 9/1944 | Hughes ........................ | 137/464 X |

FOREIGN PATENTS

| 969,401 | 9/1964 | Great Britain ............... | 137/458 |

Primary Examiner—Robert G. Nilson
Attorney—Molinare, Allegretti, Newitt & Witcoff CLAIM: An overrun control and pressure regulator with an inlet, an outlet and a fluid flow passage therebetween. A valve seat is provided on each side of the passage to cooperate with separate valves. The valves are interconnected by means of a stem and may be adjustably spaced from one another to control fluid flow rate. The stem is mechanically connected with a spring biased diaphragm on the outlet side of the regulator. The diaphragm is biased by an adjustable spring against outlet fluid pressure to provide for fluid regulation. If pressure on the outlet side of the regulator is suddenly decreased, the valves operate as an overrun control to terminate fluid flow through the regulator. A reset bypass is provided from the inlet side to the outlet side of the regulator.

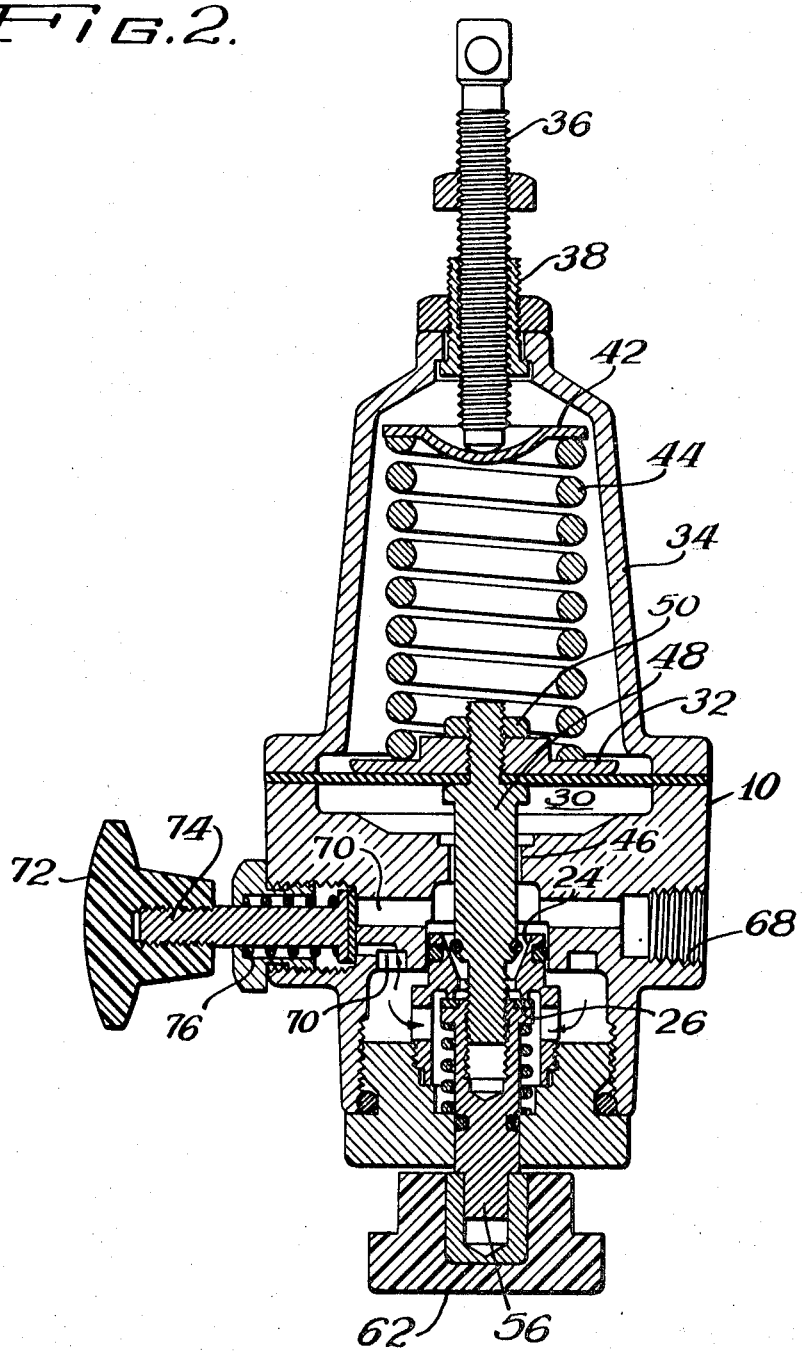

3,618,689

OVERRUN CONTROL AND PRESSURE REGULATOR

CROSS-REFERENCE TO RELATED APPLICATION

This is a continuation-in-part of Ser. No. 730,340 filed May 20, 1968 by Dale F. German, now abandoned.

BACKGROUND OF THE INVENTION

There have been instances where runaway pumps have pumped many gallons of paint, for example, onto factory floors because of hose breaks or similar malfunctions. Also, unattended pumps have destroyed themselves when a loss of liquid suction resulted from an exhausted liquid supply. These and similar experiences can be prevented by the use of a suitably designed combination regulator and overrun valve such as herein disclosed.

SUMMARY OF THE INVENTION

In a principal aspect, the present invention comprises an overrun control and pressure regulator comprising a regulator body with a fluid inlet and a fluid outlet and a fluid flow passage interposed between the inlet and the outlet. Valve seats are defined on the opposite sides of the passage. Valves are adapted to cooperate with the valve seats in response to a biased diaphragm connected with a valve stem on which the valves are mounted. The arrangement provides for pressure and fluid flow regulation and, in addition, provides for an overrun control whereby the regulator stops the flow of fluid through the regulator when outlet pressure decreases below a predetermined value.

It is thus an objects of the present invention to provide an overrun valve which will function to stop the supply of fluid to a malfunctioning or runaway pressure operated device.

Another object of the present invention is to provide an overrun valve which may be manually reset without requiring readjustment of the pressure or fluid flow settings for the regulator.

Still another object is to provide an easily adjustable fluid flow and pressure regulator. These and other objects, advantages and features of the present invention will be set forth in greater detail in the description which follows.

BRIEF DESCRIPTION OF THE DRAWINGS

In the detailed description which follows reference will be made to the drawing comprised of the following figures:

FIG. 2 is another cross-sectional view of the regulator of the present invention taken substantially 90° to the cross-sectional view of FIG. 1.

DESCRIPTION OF THE PREFERRED EMBODIMENT

Figure 1:
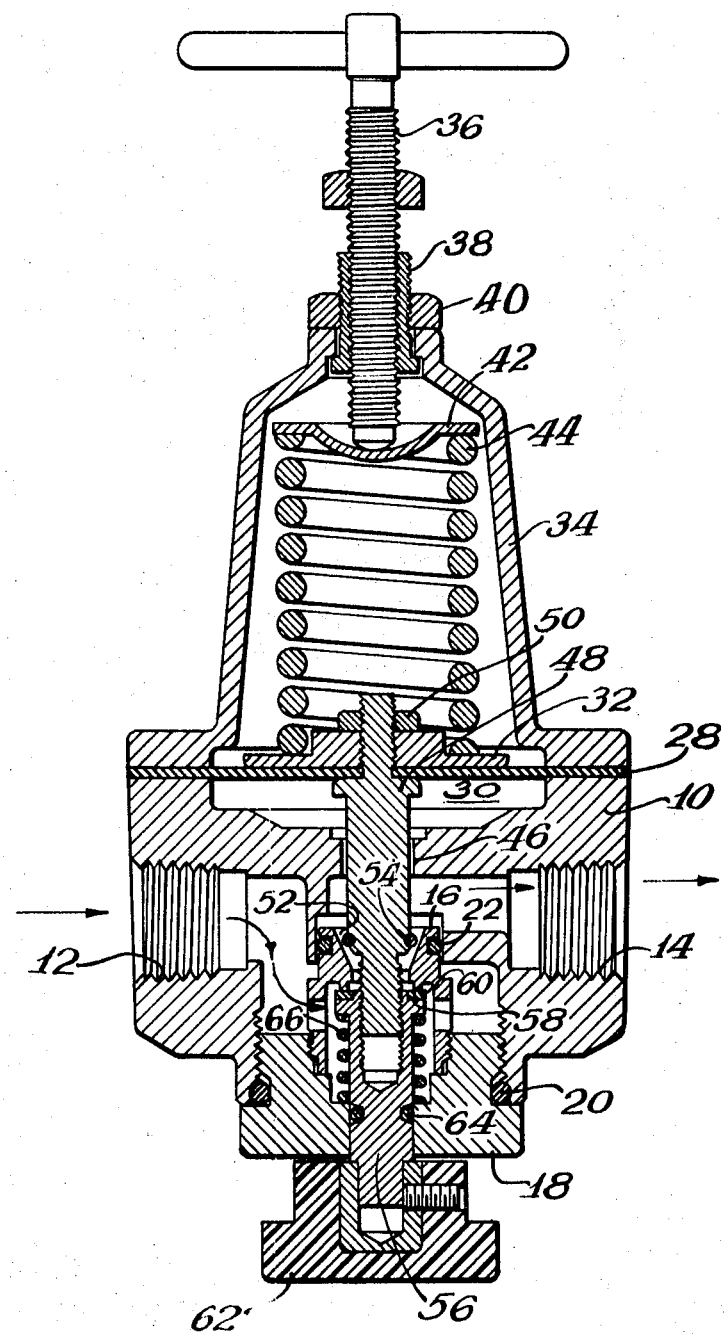
FIG. 1 is a cross-sectional view of the improved regulator of the present invention.

Referring now to the FIGURES, there are shown two cross-sectional views of the regulator of the invention taken at approximately 90° angles to each other. The regulator includes a body 10 having a threaded inlet port 12 on one side and a threaded outlet port 14 on the opposite side, approximately 180° from the inlet port. The inlet port 12 and the outlet port 14 are connected to one another for fluid flow through a valve seat block 16. Block 16 is held in position in sealed communication with the body 10 by means of a retainer block 18 threadably attached to the body 10 and sealed by O-rings 20 and 22. A first valve seat 24 is defined on the outlet port side or downstream side of the block 16. A second valve seat 26 is defined on the upstream or inlet port side of the block 16. Fluid may thus flow into the inlet port 12, through the passage block 16 and out the outlet port 14 as indicated by the arrows in the FIGURES.

Extending over the body 10 is a diaphragm 28. The diaphragm 28 serves to define a chamber 30 in the top of the body 10. A spring biased plate 32 is inserted on the diaphragm 28 in an interior cavity formed by a cap 34. Cap 34 is suitably fastened to the body 10 about the periphery of the diaphragm 28 thereby holding the diaphragm 28 in a seated relation with body 10. A rod 36 is threaded through an annular nut 38. Nut 38 is held in position by a second nut 40 on the top of the cap 34. Rod 36 engages a retainer cup 42 positioned over a diaphragm biasing spring 44. Rod 36 and spring 44 are axially aligned. The spring thus acts against the plate 32 and the diaphragm 28 to counteract any force exerted by pressure on the outlet side of the regulator acting through an annular opening 46 in body 10 and the chamber 30.

A valve stem 48, also axially aligned with rod 36, is fixed to the diaphragm plate 32 by means of a nut 50. The stem 48 thus moves coextensively with the diaphragm 28. At the lower end of the stem 48 is a tapered valve 52 with an O-ring 54 for sealing the valve 52 when it is closed. The valve 52 cooperates with a seat 24, the spacing therebetween being determinative of the maximum air flow or, in other words, regulating the maximum flow.

The far lower end of the stem 48 is threaded and receives a matching threaded lower valve stem 56. A second valve 58 is defined by the upper surface of the stem 56 and has included thereon a sealing gasket 60. The second valve 58 cooperates with the valve seat 26 to control fluid pressure through the passage block 16. The opposite end of the stem 56 extends through the retainer block 18 and is connected to an adjustment knob 62. The stem 56 is sealed against the retainer block 18 by means of an O-ring 54. A spring 66 biases the second valve 58 of the stem 56 into sealing engagement with the valve seat 26 when the regulator is in a normal unused position.

Referring now specifically to FIG. 2, a gage port 68 is provided on the outlet side of the regulator. A bypass channel 70 connects the inlet side with the outlet side of the regulator whenever a bypass knob 72 which is connected to a bypass rod 74 is pulled outwardly against the force of a spring 76 to open the bypass channel 70.

The overrun regulator operates in the following manner. The adjusting screw or stem 36 is turned in a clockwise manner causing a force on the retainer cup 42 and spring 44. This, in turn, transfers the force to the diaphragm 28. This force on the diaphragm 28 is transmitted through the valve stems 48 and 56 causing the second valve 58 to open. Nonregulated air through inlet port 12 then passes through and around the pressure control valve 58 and to the outlet side of the regulator. Note that the valve 58 functions as a means for fluid regulation in the same manner as provided in most conventional regulator constructions. That is, fluid passes up past the valve stem 48 through the annular opening 46 into the diaphragm chamber 30. This causes a force on the diaphragm 28 which balances the original spring 44 force. As pressure on the outlet side of the regulator increases valve 58 tends to close thereby restricting flow until the "set" pressure is once again maintained. Conversely, a flow increase or pressure decrease on the outlet side of the regulator causes the valve 58 to open so that the "set" pressure is again maintained.

After the regulator has been "set" at a certain pressure, the maximum amount of fluid that the regulator will permit to flow can be increased by turning the knob 62 and consequently the lower valve stem 56 counterclockwise. This increases the distance between the valve 58 and the valve seat 26. Of course, the valve 58 will seek an equilibrium position based on the spring 44 force and the fluid consumption. However, very importantly, the maximum fluid flow is now regulated by the distance between the valve 58 and the O-ring 54, i.e. valve 52. The maximum flow rate is adjustable in the same manner that the distance between valves 58 and 52 is adjustable.

After the unit has been set at a desired pressure and flow rate as specified above, and air is being consumed at a constant rate, the valve 58, the valve stem 48 and diaphragm 28 may assume any position from completely up (valve 58 being closed) down to a preset flow position (valve 58 being partially open). If, however, an increase in air consumption appears beyond the preset or maximum valve such as by a runaway pump, the pressure below the diaphragm 28 is reduced.

This causes the spring 44 to push the plate 32, diaphragm 9, connected stem 48 and valve 58 downward bringing the O-ring 54 into contact with the tapered valve seat 24. The fluid flow passage is now blocked, shutting off pressure and air flow to the outlet port 14.

The unit can be reset by merely pulling the reset knob 72. This allows fluid to pass through the channel 70 through the annular opening 46 and into the chamber 30 below the diaphragm 38. The pressure is thus built up until it counteracts the force of the spring 44 on the diaphragm 28. At that point, the diaphragm 28, stem 48 and valve 58 move upward opening the air passage as it was originally set for the original pressure and fluid flow.

What is claimed is:

1. An overrun control and pressure regulator comprising, in combination, a body having a fluid inlet and a fluid outlet with a fluid flow passage between said inlet and outlet; said passage including a first valve seat on the outlet side and a second valve seat on the inlet side; a first valve mounted to cooperate with said first valve seat; a second valve mounted to cooperate with said second valve seat for pressure regulation, said first and second valves connected by adjustable spacing means, said adjustable spacing means including knob means external said body for varying the separation of said first and second valves; and diaphragm means connected with said first valve, said diaphragm means responsive to pressure at said outlet and mechanically connected to said first valve to seat said first valve whenever said outlet flow exceeds a predetermined value.

2. The regulator of claim 1 including normally closed fluid flow bypass means from said inlet to said outlet to reset said overrun control.

3. The regulator of claim 1 wherein said diaphragm means is adjustably biased to provide additional means for adjustable pressure regulation.

4. The regulator of claim 1 wherein said adjustable spacing means includes a fixed stem interconnecting said diaphragm with said first valve, said stem also being threadably connected with a second valve stem for said second valve, said second valve stem also extending through a seal in said body and connected with said knob means.

* * * * *